United States Patent
Li et al.

(10) Patent No.: US 11,366,624 B2
(45) Date of Patent: Jun. 21, 2022

(54) SUPER-RESOLUTION CONVOLUTIONAL NEURAL NETWORK WITH GRADIENT IMAGE DETECTION

(71) Applicant: KYOCERA DOCUMENT SOLUTIONS INC., Osaka (JP)

(72) Inventors: Sheng Li, El Segundo, CA (US); Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 276 days.

(21) Appl. No.: 16/834,772

(22) Filed: Mar. 30, 2020

(65) Prior Publication Data

US 2021/0303243 A1 Sep. 30, 2021

(51) Int. Cl.
*G06F 3/12* (2006.01)
*G06K 9/62* (2022.01)
*G06T 3/40* (2006.01)
*G06N 3/04* (2006.01)

(52) U.S. Cl.
CPC .......... *G06F 3/1256* (2013.01); *G06F 3/1208* (2013.01); *G06K 9/6232* (2013.01); *G06K 9/6257* (2013.01); *G06N 3/04* (2013.01); *G06T 3/4046* (2013.01); *G06T 3/4053* (2013.01)

(58) Field of Classification Search
CPC combination set(s) only.
See application file for complete search history.

(56) References Cited

U.S. PATENT DOCUMENTS

| 9,547,887 B2 | 1/2017 | Liang et al. |
| 2020/0364870 A1* | 11/2020 | Lee .......................... G06T 7/10 |
| 2021/0271927 A1* | 9/2021 | Suh ........................ G06V 10/22 |
| 2022/0036971 A1* | 2/2022 | Yoo ........................ G16H 50/20 |

FOREIGN PATENT DOCUMENTS

WO   2003081533 A2   10/2003

OTHER PUBLICATIONS

Griswold, Applying Partial Learning to Convolutional Neural Networks, Stanford University, 6 pages.
(Continued)

*Primary Examiner* — Helen Zong
(74) *Attorney, Agent, or Firm* — GrowIP Law Group LLC

(57) ABSTRACT

An example system includes a processor and a non-transitory computer-readable medium having stored therein instructions that are executable to cause the system to perform various functions. The functions include obtaining an image associated with a print job, and providing the image as input to a convolutional neural network. The convolutional neural network includes a residual network, upscaling layers, and classification layers configured to detect whether the image is an artificial image having a computer-generated image gradient. The functions also include determining, based on an output of the classification layers, that the image is an artificial image having a computer-generated image gradient. Further, the functions include, based on determining that the image is an artificial image having a computer-generated image gradient, providing the image to an upscaling module of a print pipeline for upscaling rather than using an output of the upscaling layers for the upscaling.

20 Claims, 5 Drawing Sheets

(56) References Cited

OTHER PUBLICATIONS

He et al.. Deep Residual Learning for Image Recognition, Microsoft Research, arXiv:1512.03385v1 [cs.CV] Dec. 10, 2015, 12 pages. http://image-net.org/challenges/LSVRC/2015/and http://mscoco.org/dataset/#detections-challenge2015.
Ledig et al., Photo-Realistic Single Image Super-Resolution Using a Generative Adversarial Network, arXiv:1609 04802V5 [cs.CV] May 25, 2017, 19 pages.

* cited by examiner

SUPER-RESOLUTION CONVOLUTIONAL NEURAL NETWORK WITH GRADIENT IMAGE DETECTION

BACKGROUND

In image processing, super-resolution (SR) refers to a class of techniques for increasing the resolution of an imaging system. In a typical scenario, a SR system receives an input image and upscales the input image to a higher resolution output image. Prior to the upscaling, the details of the higher resolution output image are essentially unknown. The SR system operates by estimating the details of the higher resolution output image from characteristics of the input image.

There are various approaches for estimating a high-resolution (HR) image from its low-resolution (LR) image. For example, with the nearest neighbor approach, the color of a newly-created pixel in the HR image is determined based on the color of a nearest pixel in the LR image. With the bilinear and bicubic approaches, colors for newly-created pixels in the HR image are interpolated from colors of surrounding pixels in the LR image. Lanczos resampling is another example approach that can be used to determine colors for newly-created pixels based on the colors of surrounding pixels in the LR image.

Other approaches estimate a HR image from its LR image using machine learning. For example, some approaches utilize convolutional neural networks (CNNs) to establish a mapping between LR image information and HR image information. CNNs are neural networks that include multiple layers, and use convolution in at least one of the layers. More specifically, CNNs include convolution layers that perform a convolution by sliding a filter, referred to as a convolution filter, over an input. As a simplified example, the input may be a 10×10 matrix of input values, and the convolution filter may be a 3×3 matrix of filter values. At each slide position, the convolution layer performs a matrix multiplication between the convolution filter and the portion of the input identified by the slide position. The portion identified by the slide position is referred to as the receptive field. The resulting sum is then added to a feature map at a position corresponding to the receptive field.

SR generative adversarial networks (SRGANs) are machine learning systems that use two competing neural networks in order to generate synthetic SR images that appear to be real images. The two competing neural networks are referred to as a generator network and a discriminator network. The generator network is a CNN that receives a LR image as input and generates a HR image as output. The discriminator network is a separate CNN that is trained to distinguish SR images generated by the generator network from real images. During a training process, the generator network and the discriminator network can be optimized in an alternating manner, such that the generator network learns to generate SR images that are very similar to real images and, as such, difficult for the discriminator network to distinguish from real images. After sufficient training, the generator network can be used for SR.

SUMMARY

In one example, a system is described. The system includes a processor and a non-transitory computer-readable medium having stored therein instructions that are executable to cause the system to perform various functions. The functions include obtaining an image associated with a print job, and providing the image as input to a CNN. The CNN includes a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image. The functions also include determining, based on an output of the classification layers corresponding to the image, that the image is an artificial image having a computer-generated image gradient. In addition, the functions include, based on determining that the image is an artificial image having a computer-generated image gradient, providing the image to an upscaling module of a print pipeline for upscaling rather than using an output of the upscaling layers corresponding to the image for the upscaling.

In another example, a computer-implemented method is described. The method includes obtaining an image associated with a print job, and providing the image as input to a CNN. The CNN includes a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image. The method also includes determining, based on an output of the classification layers corresponding to the image, that that image is an artificial image having a computer-generated image gradient. In addition, the method includes, based on the determining that the image is an artificial image having a computer-generated image gradient, providing the image to an upscaling module of a print pipeline for upscaling rather than using an output of the upscaling layers corresponding to the image for the upscaling.

In another example, a non-transitory computer-readable medium is described. The non-transitory computer-readable medium has stored therein instructions that are executable to cause a system to perform functions. The functions include obtaining an image associated with a print job, and providing the image as input to a CNN. The convolutional neural network includes a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image. The functions also include determining, based on an output of the classification layers corresponding to the image, that the image is an artificial image having a computer-generated image gradient. In addition, the functions include, based on determining that the image is an artificial image having a computer-generated image gradient, providing the image to an upscaling module of a print pipeline for upscaling rather than using an output of the upscaling layers corresponding to the image for the upscaling.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
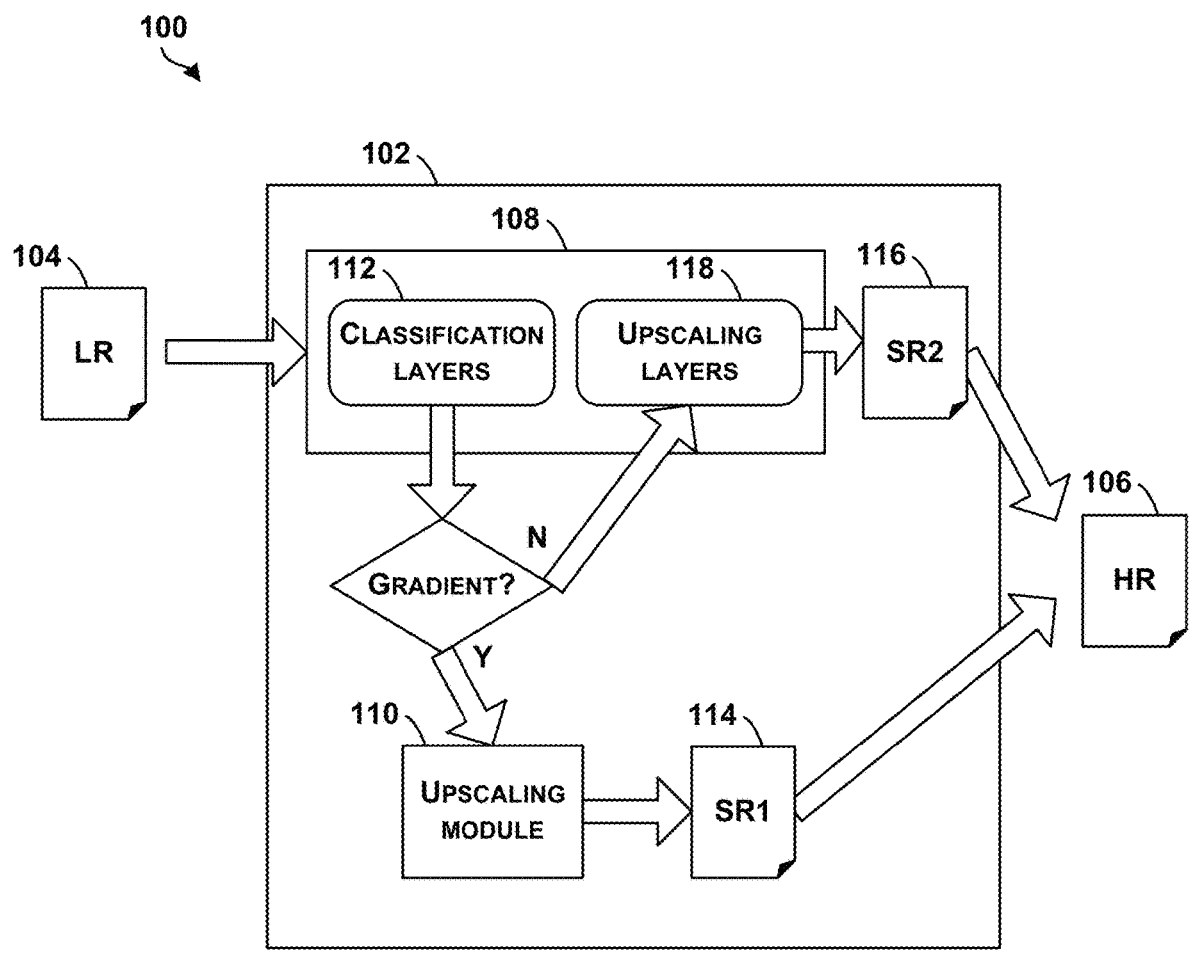
FIG. 1 conceptually illustrates an example system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

In some instances, using a generator network of a SRGAN to perform SR is a good approach. For instance, given a good quality, natural image, a generator network of a SRGAN can output a SR image that has a higher resolution than the input image and is nearly indistinguishable from real images.

Unfortunately, however, such a generator network may not handle certain types of input images as successfully. For instance, the generator network may perform poorly when attempting to upscale an artificial image having a computer-generated image gradient, such as a directional change in intensity or color. As a particular example, when attempting to upscale an artificial image having a computer-generated image gradient, the generator network may output a SR image having contours or edges that do not exist in the input image. As used herein, an artificial image refers to a synthetic image that is computer-generated. Synthetic images generated from mathematical equations are an example of artificial images.

Described herein are systems and methods to address this and potentially other issues. In an example method, an image associated with a print job is provided as input to a CNN. The CNN includes convolution layers configured to extract feature maps from the image and classification layers configured to detect whether the image is an artificial image having a computer-generated image gradient. Based on an output of the classification layers corresponding to the image, a computing device determines that the image is an artificial image having a computer-generated image gradient. Further, based on the determining that the image is an artificial image having a computer-generated image gradient, the computing device provides the image to an upscaling module of a print pipeline for upscaling rather than using an output of the CNN for the upscaling.

In some examples, the upscaling module may upscale the image using a technique that handles upscaling of artificial images having computer-generated gradients better than the CNN, such as a nearest neighbor approach or an interpolation approach. Advantageously, using the upscaling module to upscale the image rather than the CNN can help to avoid generating a SR image that includes noticeable artifacts, such as edges or contours that do not exist in the image associated with the print job.

Further, in some examples, the CNN can include upscaling layers configured to increase a resolution of the image. The classification layers can be arranged parallel to the upscaling layers. With this arrangement, the classification layers can detect artificial images having computer-generated image gradients without significantly slowing down the print pipeline. Further, this approach may be preferable to adding a separate classifier that is configured to detect artificial images having computer-generated image gradients to the print pipeline in front of the CNN. For instance, providing the classification layers in parallel with the upscaling layers is simpler and faster than inserting a separate classifier into the print pipeline in front of the CNN. The classification layers can leverage feature maps extracted by convolution layers of the CNN to detect artificial images having computer-generated image gradients.

Various other features of the example method discussed above, as well as other methods and systems, are described hereinafter with reference to the accompanying figures.

Referring now to the figures, FIG. 1 is a conceptual illustration of an example system 100. In line with the discussion above, system 100 may be used to perform image upscaling for an image of a print job. As shown in FIG. 1, system 100 includes a computing device 102 that can obtain an image 104 associated with a print job and output an upscaled image 106. To obtain upscaled image 106, computing device 102 can be configured to process image 104 using a print pipeline having a CNN 108 and an upscaling module 110.

As an initial step in this processing, computing device 102 can be configured to provide image 104 as input to CNN 108, and to determine an output of classification layers 112 of CNN 108 corresponding to image 104. The output of classification layers 112 can vary depending on whether or not image 104 is an artificial image having a computer-generated image gradient. One example of a computer-generated image gradient is a directional change in intensity within an image. Another example of a computer-generated image gradient is a directional change in color within an image.

Further, computing device 102 can be configured to determine whether or not the output of classification layers 112 indicates that image 104 is an artificial image having a computer-generated image gradient. For instance, computing device 102 can be configured to determine that the value of a gradient flag is one, and interpret the value of gradient flag being one to mean that image 104 has been classified as an artificial image having a computer-generated image gradient. In addition, computing device 102 can be configured to provide image 104 to upscaling module 110 for upscaling upon determining that the output of classification layers 112 indicates that image 104 is an artificial image having a computer-generated image gradient. And computing device 102 can be configured to provide a first SR image 114 that is output by upscaling module 110 as upscaled image 106.

Similarly, computing device 102 can be configured to determine that the value of a gradient flag is zero, and interpret the value of gradient flag being zero to mean that image 104 has not been classified as an artificial image having a computer-generated image gradient. Further, computing device 102 can be configured to provide a second SR image 116 that is output by upscaling layers 118 of CNN 108 as upscaled image 106 upon determining that the output of classification layers 112 indicates that image 104 is not an artificial image having a computer-generated image gradient.

In some examples, upscaling layers 118 of CNN 108 can generate second SR image 116 regardless of whether the output of classification layers is indicative of image 104 being an artificial image having a computer-generated image gradient. With this implementation, computing device 102 can be configured to discard second SR image 116 based on determining that image 104 is an artificial image having a computer-generated image gradient. For instance, computing device 102 can be configured to delete second SR image 116 from a memory.

Computing device 102 could be any type of computing device, such as a mobile phone, tablet computer, wearable computer, desktop computer, laptop computer, etc. Computing device 102 can include a processor, and a non-transitory computer-readable medium having stored therein instructions that are executable to cause computing device 102 to perform the computing device functions described herein. For instance, the non-transitory computer-readable medium could store instructions that are executable to cause computing device 102 to: obtain image 104; provide image 104 as input to CNN 108; determine, based on an output of classification layers 112 corresponding to image 104, that image 104 is an artificial image having a computer-generated image gradient; and provide image 104 to upscaling module 110 for upscaling rather than using an output of upscaling layers 118 corresponding to image 104 for the upscaling.

In addition to classification layers 112 and upscaling layers 118, CNN 108 can include residual blocks (not shown). The residual blocks can be configured to extract feature maps from image 104. For instance, each residual block can perform multiple matrix multiplications between a convolution filter and respective receptive fields of image 104, so as to generate a feature map.

Classification layers 112 can be configured to detect whether image 104 is an artificial image having a computer-generated image gradient based on feature maps extracted by the convolution layers. For instance, the output of classification layers 112 may be a binary flag that is indicative of whether or not image 104 is an artificial image having a computer-generated image gradient. Upscaling layers 118 can be configured to increase a resolution of image 104 based on feature maps extracted by the residual blocks.

Upscaling module 110 can be configured to receive image 104 as input and to output an image having a higher resolution than image 104, specifically, first SR image 114. In one example, upscaling module 110 can determine a color for each newly-created pixel in first SR image 114 based on the color of a nearest pixel to the newly-created pixel in image 104. In other examples, upscaling module 110 can determine colors for newly-created pixels in first SR image 114 by interpolating colors of surrounding pixels in image 104. In still other examples, upscaling module 110 can use Lanczos resampling to determine colors for newly-created pixels in first SR image 114. Other upscaling techniques are also contemplated.

In some examples, system 100 can further include a printing device (not shown). The printing device can be configured to print upscaled image 106. Additionally or alternatively, system 100 can further include a display device (not shown). The display device can be configured to display upscaled image 106.

Figure 2:
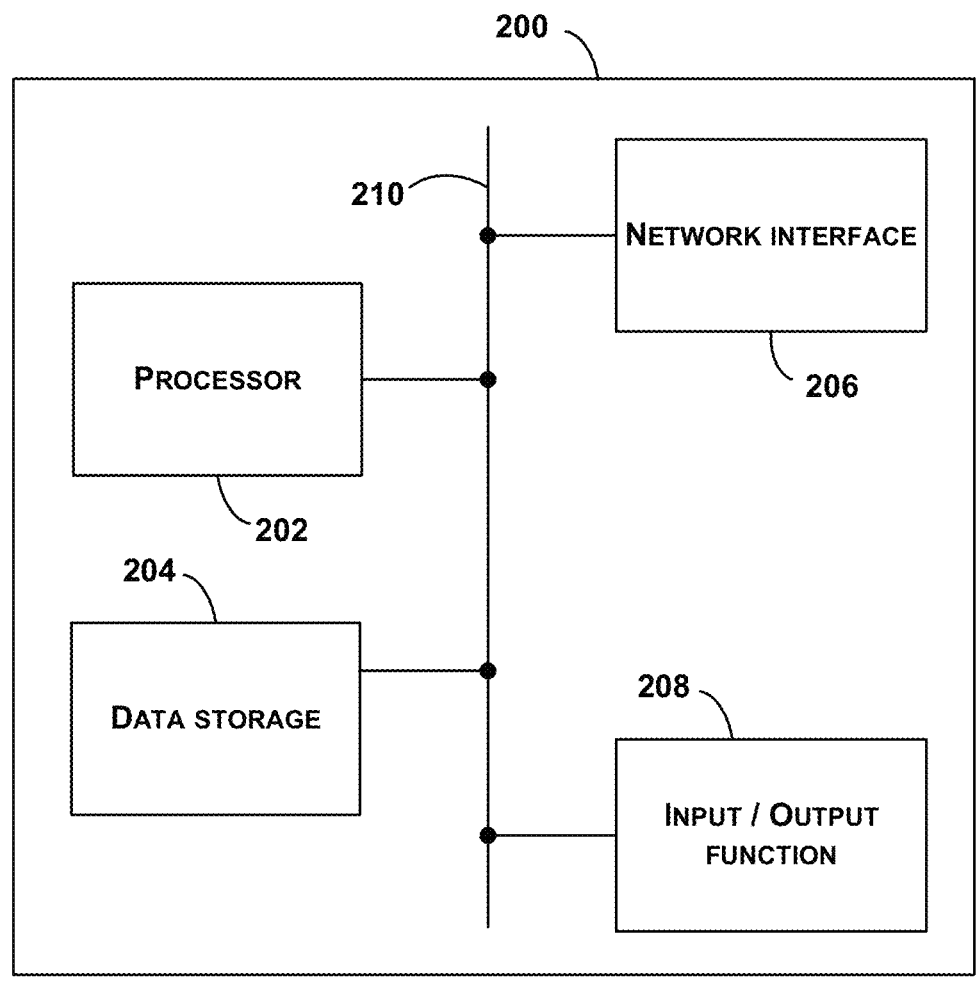
FIG. 2 illustrates an example computing device, according to an example embodiment.

FIG. 2 illustrates an example computing device 200, according to an example embodiment. FIG. 2 illustrates one or more of the functional elements that may be found in a device arranged to operate in accordance with the embodiments herein, such as computing device 102 of FIG. 1.

Computing device 200 may include a processor 202, data storage 204, network interface 206, and input/output function 208, all of which may be coupled by a system bus 210 or a similar mechanism. Processor 202 may include one or more central processing units (CPUs), such as one or more general purpose processors and/or one or more dedicated processors (e.g., application specific integrated circuits also known as ASICs or digital signal processors also known as DSPs, etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause computing device 200 to carry out any of the methods, processes, or functions disclosed in this specification or the accompanying drawings.

Network interface 206 may take the form of a wire line connection, such as an Ethernet, Token Ring, or T-carrier connection. Network interface 206 may alternatively take the form of a wireless connection, such as WiFi, BLUETOOTH®, or a wide-area wireless connection. However, other forms of physical layer connections and other types of standard or proprietary communication protocols may be used over network interface 206. Furthermore, network interface 206 may comprise multiple physical communication interfaces.

Input/output function 208 may facilitate user interaction with example computing device 200. Input/output function 208 may comprise multiple types of input devices, such as a keyboard, a mouse, a touch screen, a microphone and/or any other device that is capable of receiving input from a user. Similarly, input/output function 208 may comprise multiple types of output devices, such as a display, printer, one or more light emitting diodes (LEDs), speaker, or any other device that is capable of providing output discernible to a user. Additionally or alternatively, example computing device 200 may support remote access from another device, via network interface 206 or via another interface (not shown), such as an RS-132 or Universal Serial Bus (USB) port.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Figure 3:
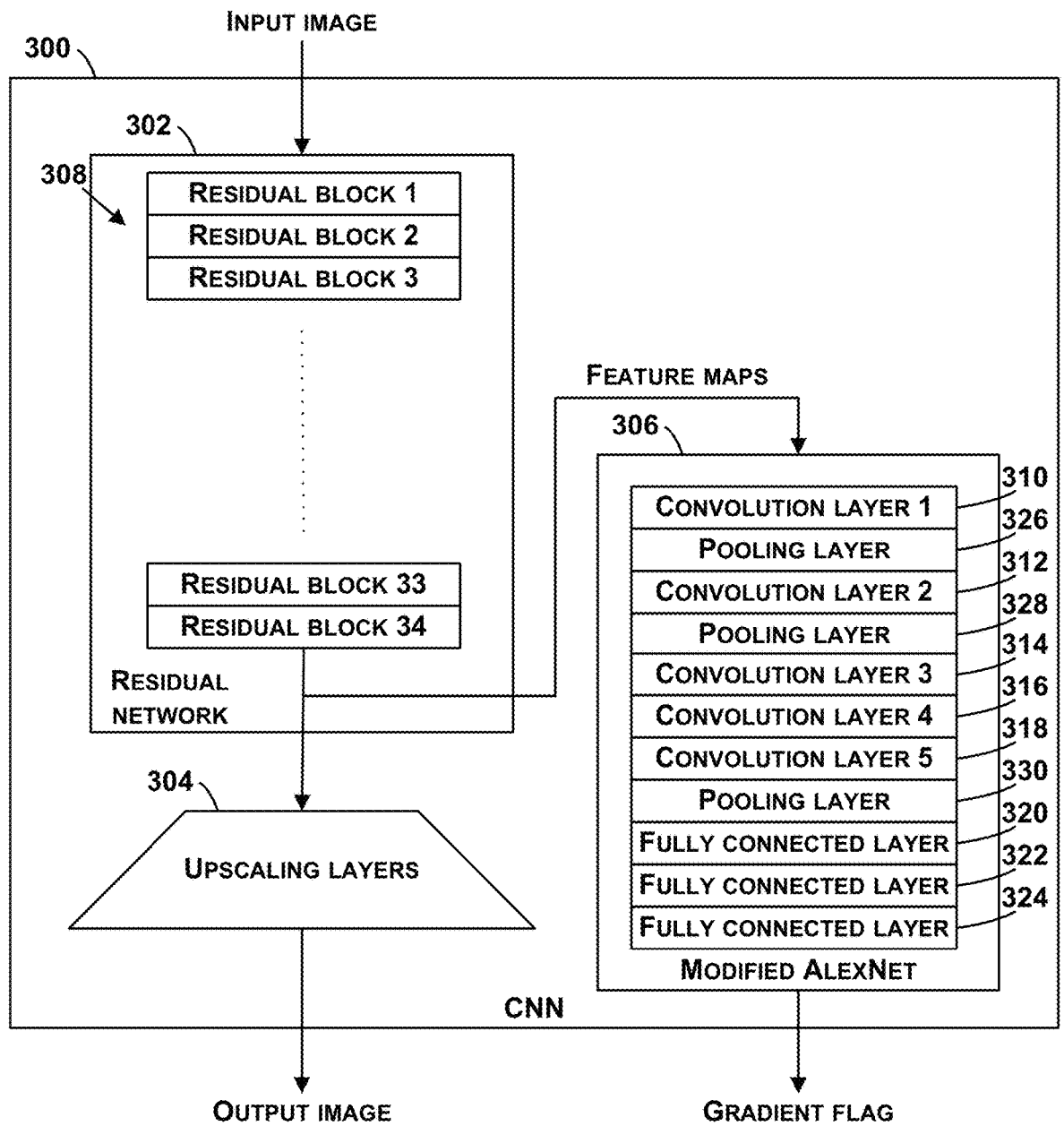
FIG. 3 is a conceptual illustration of a CNN, according to an example embodiment.

FIG. 3 is a conceptual illustration of a CNN 300, according to an example embodiment. CNN 300 is an example of a neural network that one or more computing devices can train and use to increase the resolution of an image, such as image 104 of FIG. 1.

As shown in FIG. 3, CNN 300 includes a residual network 302, upscaling layers 304, and classification layers 306. Residual network 302, in turn, includes multiple residual blocks 308 configured to extract feature maps from an input image. Each residual block of residual blocks 308 can include a convolution filter having weights that are learned during a training process. In addition, each residual block of residual blocks 308 can include a rectified linear unit (RELU) layer. The RELU layer of a residual block can apply a non-saturating activation function to values output by the convolution layer of the residual block. Applying the non-saturating activation function to values output by the convolution layer can remove negative values by setting them to zero.

In the example shown in FIG. 3, residual network 302 includes thirty-four residual blocks. In other examples, residual network 302 can include greater or fewer residual blocks. Further, residual network 302 includes skip connections that allow some of the residual blocks to not only feed into the next residual block below the residual block but to also feed into a residual block that is two or three layers below the residual block. These skip connections can help to avoid the problem of vanishing gradients when training CNN 300.

Upscaling layers 304 includes multiple layers configured to increase a resolution of the input image based on the feature maps extracted from the input image. For instance, upscaling layers can include one or more sub-pixel convolution layers that resolve HR image data from LR feature maps generated by residual network 302. After the feature maps are provided as input to upscaling layers 304, upscaling layers 304 output an output image having a higher resolution than the input image.

Classification layers 306 include multiple layers configured to detect whether the input image is an artificial image having a computer-generated image gradient based on feature maps extracted from the image. Classification layers 306 can receive, as input, feature maps extracted from an image by residual network 302. As shown in FIG. 3, in an example implementation, classification layers 306 can be configured as a modified AlexNet. AlexNet is a CNN designed by Alex Krizhevsky, and is designed to process image data having three channels (i.e., RGB image data). The modified AlexNet includes five convolution layers 310, 312, 314, 316, 318 and three fully connected layers 320, 322, 324. Convolution layers 310, 314, and 316 are followed by pooling layers 326, 328, 330, respectively. Because feature maps extracted from an image by residual network 302 are deeper (e.g., sixty-four channels) than image data having three channels, a first convolution layer 310 of the modified AlexNet is modified from the design of the first convolution layer of AlexNet, such that first convolution layer 310 is adapted to the input channels of the feature maps extracted by residual network 302. Classification layers 306 can take other forms as well. Hence, the example is not meant to be limiting.

In one example, classification layers 306 can output an output vector including two values. A first value may be a number indicative of a probability that the input image is an artificial image having a computer-generated image gradient, and the second value may be a number indicative of a probability that the input image is not an artificial image having a computer-generated image gradient. A computing device can compare the first value and the second value to determine whether to set the value of a gradient flag to zero or one. For instance, if the first value is greater than the second value, the computing device can set the gradient flag to one. Alternatively, the computing device can compare the first value to a threshold, and the computing device can determine whether to set the value of the gradient flag to zero or one based on a result of the comparison. For instance, if the probability that the input image is an artificial image having a computer-generated image gradient is greater than seventy-five percent, the computing device can set the gradient flag to one.

Weights associated with residual network 302, upscaling layers 304, and classification layers 306 can be learned during a training process. In an example training process, partial training can be used to train classification layers 306 separately from the training of residual network 302 and upscaling layers 304.

By way of example, a generator network that is identical to CNN 300 but does not include classification layers 306 can be created. A competing discriminator network can also be created. The discriminator network can include multiple convolution layers, one or more fully connected layers, and a sigmoid activation function. In accordance with the GAN model, the generator network and the discriminator network can be trained in an alternative manner, such that the generator network learns to create HR images that are highly similar to real images using LR images as input, and that are difficult to classify by the discriminator network. As part of this training, weights of the residual network and upscaling layers of the generator network may be learned. After learning the weights of the generator network, the network can be frozen by setting the learning rate of the weights of the generator network to zero, and saving the parameters of the generator network to a file.

Further, the pre-trained parameters (e.g., weights and learning rates) of the generator network can then be loaded into corresponding layers of CNN 300. After loading the pre-trained parameters of the generator network into CNN 300, weights of classification layers 306 can be learned during a subsequent training process. For instance, classification layers 306 can be trained using a training set of training images that includes: images known to be artificial images having computer-generated image gradients, and real images. With such a training set, classification layers 306 can be trained by adjusting weights of classification layers 306 to improve the ability of classification layers to accurately detect whether an image is an artificial image having a computer-generated image gradient. The ability to accurately detect whether an image is an artificial image having a computer-generated image gradient can be improved by minimizing observed errors, which can be quantified using a cost function. One method for adjusting weights during the training is backpropagation of errors.

During the training of classification layers 306, the learning rate of the weights of residual network 302 and upscaling layers 304 can remain at zero, such that those weights are not updated during the training of classification layers 306.

Figure 4:
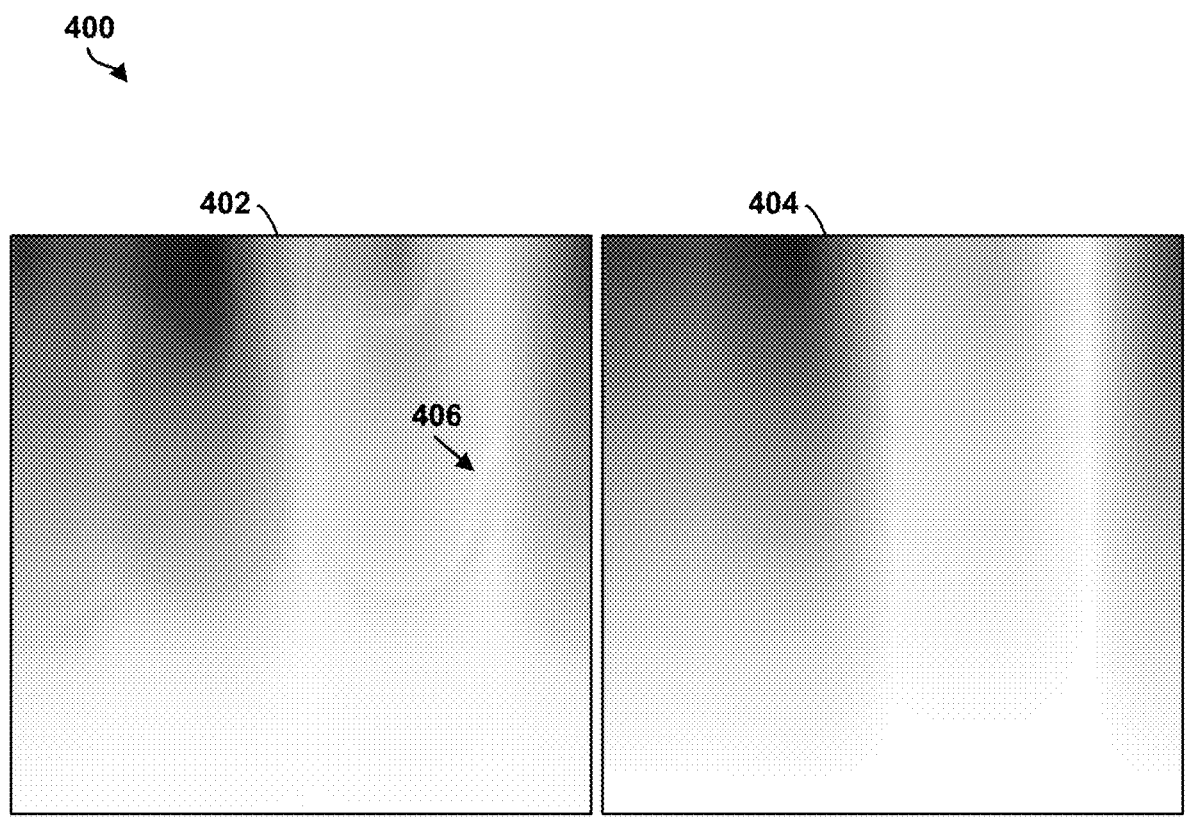
FIG. 4 illustrates a first HR image and a second HR image, according to an example embodiment.

FIG. 4 illustrates a first HR image 402 and a second HR image 404, according to an example embodiment. First HR image 402 is generated from a LR image using a CNN, such as CNN 300 of FIG. 3. Second HR image 404 is generated from the same LR image using an upscaling module, such as upscaling module 110 of FIG. 1, using a nearest neighbor approach. The LR image is an artificial image having computer-generated image gradients, namely, a directional change in color in the horizontal direction and a directional change in intensity in the vertical direction.

As evident from a side-by-side comparison of first HR image 402 and second HR image 404, second HR image 404 performs better in terms of generating a realistic HR image. First HR image 402 includes noticeable artifacts in the form of contours 406 that do not exist in the LR image. Whereas, second HR image 404 does not include these noticeable artifacts.

To avoid the appearance of these artifacts, when LR image is provided as an image associated with a print job, a computing device, such as computing device 102 of FIG. 1, can determine that the LR image is an artificial image having a computer-generated image gradient. Based on making this determination, the computing device can opt to upscale the LR image using an upscaling module rather than using a CNN to upscale the LR image.

Figure 5:
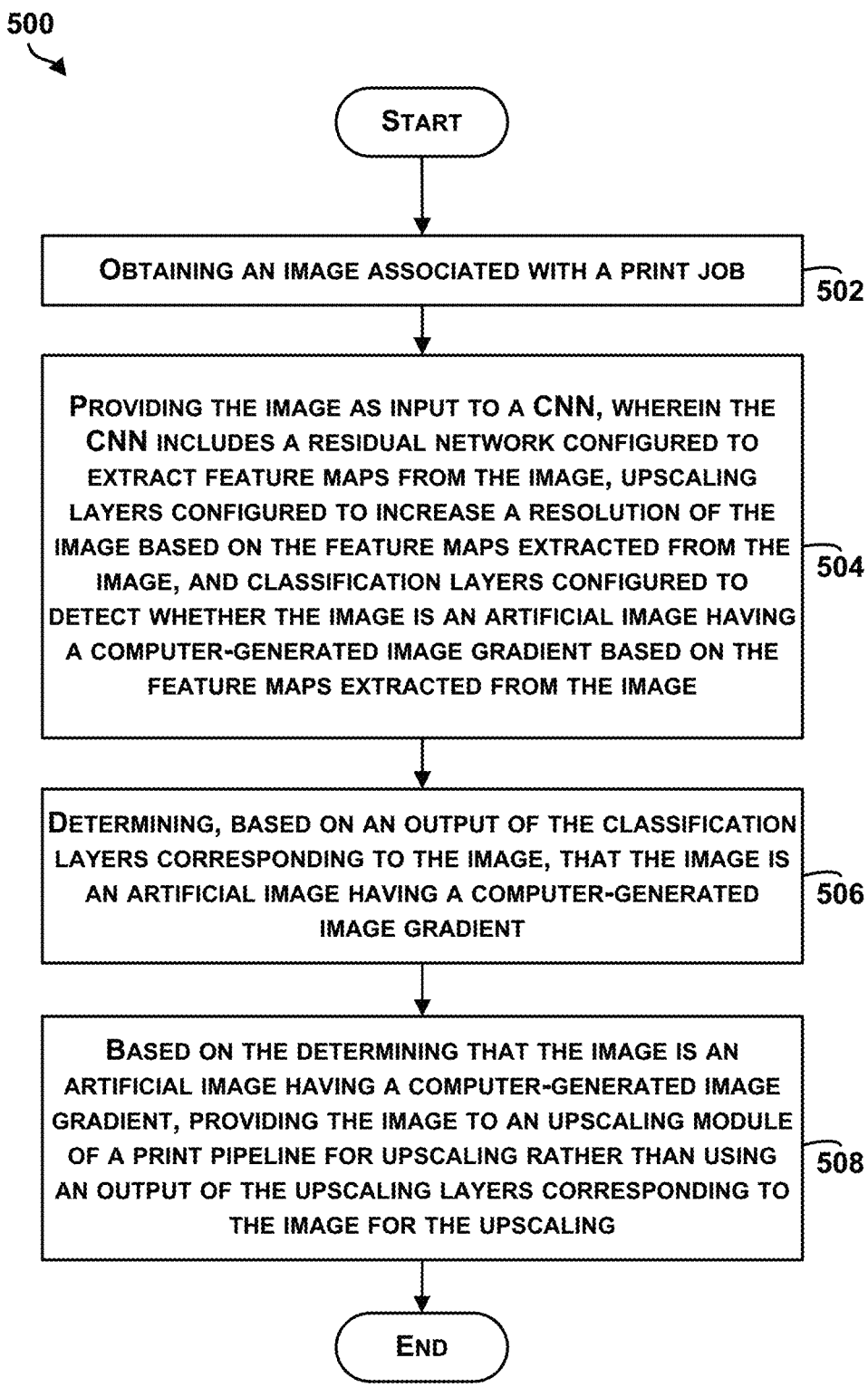
FIG. 5 shows a flowchart of an example method, according to an example embodiment.

FIG. 5 shows a flowchart of an example method 500, according to an example embodiment. Method 500 shown in FIG. 5 presents an embodiment of a method that, for example, could be used with the system shown in FIG. 1, for example, or any of the systems disclosed herein. For example, method 500 could be carried out by computing device 102 of FIG. 1 and/or could be carried out by other types of devices or device subsystems.

Method 500 may include one or more operations, functions, or actions as illustrated by one or more of blocks 502-508. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 502, the method 500 includes obtaining an image associated with a print job. At block 504, the method 500 includes providing the image as input to a CNN. The CNN includes a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image. At block 506, the method 500 includes determining, based on an output of the classification layers corresponding to the image, that the image is an artificial image having a computer-generated image gradient. And at block 508, the method 500 includes, based on the determining that the image is an artificial image having a computer-generated image gradient, providing the image to an upscaling module of a print pipeline for upscaling rather than using an output of the upscaling layers corresponding to the image for the upscaling.

In some examples, the computer-generated image gradient can include a directional change in intensity within the image, such as a directional change in intensity that is specified by a mathematical equation. In other examples, the computer-generated image gradient can include a directional change in color within the image, such as a directional change in color that is specified by a mathematical equation.

In some examples, the upscaling layers are parallel to the classification layers. Hence, when the image is provided as input to the CNN, the CNN can perform upscaling and classification in parallel. Further, in some examples, the residual network can include a plurality of residual blocks. Still further, the classification layers can include a convolution layer, a pooling layer, and a fully connected layer.

In some examples, the method 500 can further include discarding the output of the upscaling layers corresponding to the image based on the determining that the image is an artificial image having a computer-generated image gradient. This can help to prevent the output of the upscaling layers from being utilized within a subsequent portion of the print pipeline.

Additional blocks of the method 500 can also include: obtaining another image; providing the other image as input to the CNN; determining, based on an output of the classification layers corresponding to the other image that the image is not an artificial image having a computer-generated image gradient; and using an output of the upscaling layers corresponding to the other image for upscaling the other image.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a processor; and
a non-transitory computer-readable medium having stored therein instructions that are executable to cause the system to perform functions comprising:
obtaining an image associated with a print job,
providing the image as input to a convolutional neural network, wherein the convolutional neural network comprises a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image,
determining, based on an output of the classification layers corresponding to the image, that the image is an artificial image having a computer-generated image gradient, and
based on the determining that the image is an artificial image having a computer-generated image gradient, providing the image to an upscaling module of a print pipeline for upscaling rather than using an output of the upscaling layers corresponding to the image for the upscaling.

2. The system of claim 1, wherein the computer-generated image gradient comprises a directional change in intensity within the image.

3. The system of claim 1, wherein the computer-generated image gradient comprises a directional change in color within the image.

4. The system of claim 1, wherein the functions further comprise discarding the output of the upscaling layers corresponding to the image based on the determining that the image is an artificial image having a computer-generated image gradient.

5. The system of claim 1, wherein the upscaling layers are parallel to the classification layers.

6. The system of claim 1, wherein the residual network comprises a plurality of residual blocks.

7. The system of claim 6, wherein the classification layers comprise a convolution layer, a pooling layer, and a fully connected layer.

8. The system of claim 7, wherein the classification layers comprise five convolution layers followed by three fully connected layers.

9. The system of claim 1, wherein the system comprises a printing device, and wherein the functions further comprise:
    obtaining an upscaled image from the upscaling module; and
    printing the upscaled image.

10. The system of claim 1, wherein the functions further comprise:
    obtaining another image;
    providing the other image as input to the convolutional neural network;
    determining, based on an output of the classification layers corresponding to the other image that the image is not an artificial image having a computer-generated image gradient; and
    using an output of the upscaling layers corresponding to the other image for upscaling the other image.

11. The system of claim 1, wherein the classification layers are trained using a set of training images comprising images that are known to be artificial images having computer-generated image gradients.

12. The system of claim 11, wherein during training of the classification layers, parameters of the residual network and the upscaling layers are not updated.

13. The system of claim 12, wherein prior to training of the classification layers, the residual network and the upscaling layers are preloaded with pre-trained parameters.

14. A computer-implemented method comprising:
    obtaining an image associated with a print job;
    providing the image as input to a convolutional neural network, wherein the convolutional neural network comprises a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image;
    determining, based on an output of the classification layers corresponding to the image, that the image is an artificial image having a computer-generated image gradient; and
    based on the determining that the image is an artificial image having a computer-generated image gradient, providing the image to an upscaling module of a print pipeline for upscaling rather than using an output of the upscaling layers corresponding to the image for the upscaling.

15. The computer-implemented method of claim 14, further comprising discarding the output of the upscaling layers corresponding to the image based on the determining that the image is an artificial image having a computer-generated image gradient.

16. The computer-implemented method of claim 14, wherein the upscaling layers are parallel to the classification layers.

17. The computer-implemented method of claim 14, further comprising:
    obtaining an upscaled image from the upscaling module; and
    printing the upscaled image.

18. A non-transitory computer-readable medium having stored therein instructions that are executable to cause a system to perform functions comprising:
    obtaining an image associated with a print job;
    providing the image as input to a convolutional neural network, wherein the convolutional neural network comprises a residual network configured to extract feature maps from the image, upscaling layers configured to increase a resolution of the image based on the feature maps extracted from the image, and classification layers configured to detect whether the image is an artificial image having a computer-generated image gradient based on the feature maps extracted from the image;
    determining, based on an output of the classification layers corresponding to the image, that the image is an artificial image having a computer-generated image gradient; and
    based on the determining that the image is an artificial image having a computer-generated image gradient, providing the image to an upscaling module of a print pipeline for upscaling rather than using an output of the upscaling layers corresponding to the image for the upscaling.

19. The non-transitory computer-readable medium of claim 18, wherein the functions further comprise discarding the output of the upscaling layers corresponding to the image based on the determining that the image is an artificial image having a computer-generated image gradient.

20. The non-transitory computer-readable medium of claim 18, wherein the upscaling layers are parallel to the classification layers.

* * * * *